(12) United States Patent
Kage et al.

(10) Patent No.: US 7,158,177 B2
(45) Date of Patent: Jan. 2, 2007

(54) APPARATUS FOR AND METHOD OF SYNTHESIZING FACE IMAGE

(75) Inventors: Hiroshi Kage, Tokyo (JP); Jun Mitsuishi, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 798 days.

(21) Appl. No.: 10/254,529

(22) Filed: Sep. 26, 2002

(65) Prior Publication Data

US 2003/0189654 A1 Oct. 9, 2003

(30) Foreign Application Priority Data

Apr. 4, 2002 (JP) ............... 2002-102444

(51) Int. Cl.
H04N 5/262 (2006.01)
G06K 9/00 (2006.01)
H04B 1/38 (2006.01)

(52) U.S. Cl. ............ 348/239; 382/118; 345/581; 455/566

(58) Field of Classification Search ........ 348/239, 348/580, 511; 382/118; 345/473, 581; 455/566, 455/567
See application file for complete search history.

(56) References Cited

U.S. PATENT DOCUMENTS

| | | | |
|---|---|---|---|
| 4,949,286 A * | 8/1990 | Ohba | ............ 345/585 |
| 5,649,086 A | 7/1997 | Belfer et al. | |
| 5,764,790 A | 6/1998 | Brunelli et al. | |
| 5,982,912 A | 11/1999 | Fukui et al. | |
| 5,995,119 A * | 11/1999 | Cosatto et al. | ............ 345/473 |
| 6,512,819 B1 | 1/2003 | Sato et al. | |
| 2002/0015514 A1 * | 2/2002 | Kinjo | ............ 382/118 |
| 2002/0054032 A1 | 5/2002 | Aoki et al. | |
| 2002/0070945 A1 | 6/2002 | Kage | |

FOREIGN PATENT DOCUMENTS

| | | |
|---|---|---|
| EP | 1 033 878 | 9/2000 |
| JP | 10-187931 | 7/1998 |
| JP | 10-255017 | 9/1998 |
| JP | 10293860 A * | 11/1998 |
| JP | 11-169357 | 6/1999 |
| JP | 2000-354233 | 12/2000 |
| JP | 2001-24776 | 1/2001 |

* cited by examiner

Primary Examiner—Lin Ye
(74) Attorney, Agent, or Firm—Leydig, Voit & Mayer, Ltd.

(57) ABSTRACT

An image of a face of a person is acquired. Image data corresponding to the head is extracted from the image of the face. The image data is enlarged, reduced, or rotated to obtain an image of the head that is vibrating. The vibrating image of the head is displayed on a display.

11 Claims, 10 Drawing Sheets

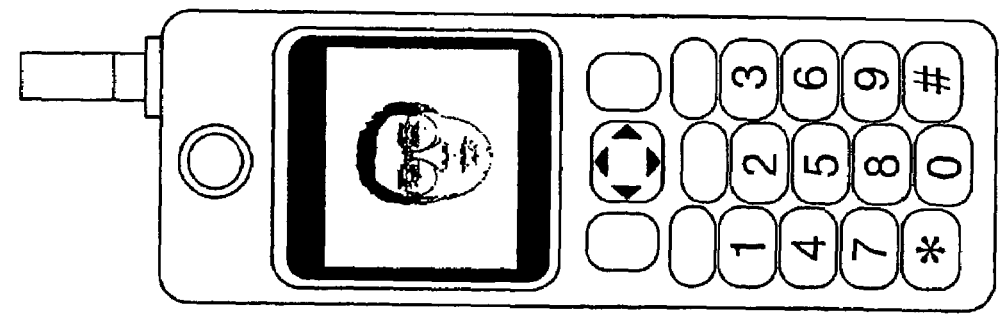
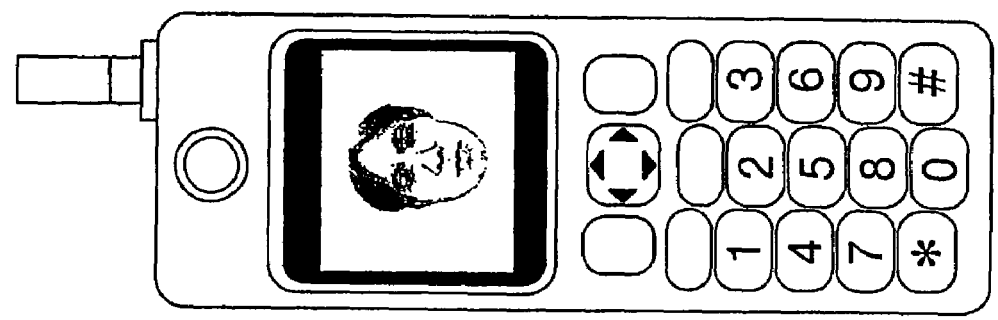
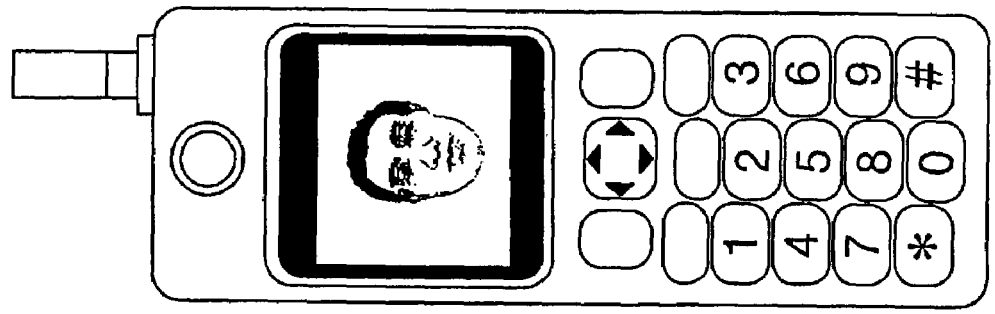
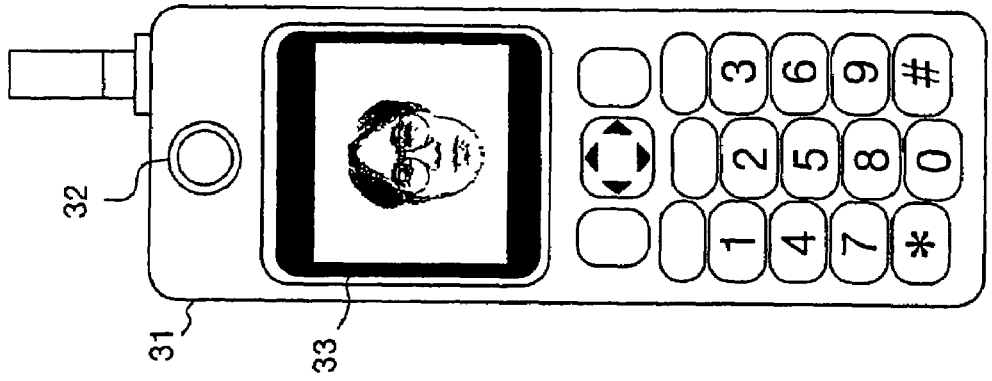

APPARATUS FOR AND METHOD OF SYNTHESIZING FACE IMAGE

BACKGROUND OF THE INVENTION

1) Field of the Invention

The present invention relates to a technology for acquiring a face region of a photographed target person from a two-dimensional image which includes the face of the person and also processes the face region.

2) Description of the Related Art

The number of portable terminals such as cellular phones and PDA's (Personal Digital Assistants) with cameras has recently increased and it is expected that the portable terminals will be utilized in varied manners. There are various targets of the camera provided on each portable terminal or the like. From the ordinary users' viewpoint, the face of a person may be first on the target list. In one manner of the use of a photographed face image, the face image is assumed to be used as an attachment file of an e-mail when the e-mail is transmitted through a cellular phone or as the background image of a waiting screen.

As an example of conventional art which utilizes such a face image on the waiting screen of a cellular phone, there is a telephone equipment which is disclosed in Japanese Patent Application Laid-Open No. 2001-24776. According to this telephone equipment, if there is a call from a person on the other end of the line, an image such as a photograph of a face which corresponds to a telephone number of the person on the other end of the line is extracted from image data which is registered in the telephone equipment and displayed. By doing so, a recognition unit which recognizes the person on the other end of the line and which has a high visual effect is realized.

However, the conventional art which is disclosed in the Japanese Patent Application Laid-Open No. 2001-24776 has the following restrictions. Only the face images for which image data is already registered in the telephone equipment can be displayed and the face images can be displayed only as still images.

In comparison to these conventional uses of the telephone equipment, if the face image of a person on the other end of the line can be changed, like an animation according to the length of wait time until talking starts and the animation can be displayed on a display section, or, more specifically, if the operation of the vibrator of a cellular phone when a call is received is detected and estimated and thereby a vibrating face image can be displayed, then it is possible to provide not only visual interest but also information as to who is calling and how long the person on the other end of the line has been waiting, to the owner of the cellular phone (i.e., called person).

Further, if two face images can be selected from face images which are stored or photographed using an accessory camera as face images to be displayed on a waiting screen and a new face image obtained by synthesizing the two face images can be employed, then it is possible to provide a new usage of the face images in the portable terminal or the like. For example, it is possible to synthesize the face of a possible child of a couple and to utilize the synthesized face on the waiting screen of a cellular phone. In this way, it is possible to provide an effective usage of face image which is not feasible for the conventional cellular phone which uses only the face images stored or photographed by the camera.

To date, however, there exists no such a portable terminal, such as a cellular phone, which functions to display a face image which changes like an animation when a call is received or to exchange a part of one of the two photographed face images with that of the other face image, to synthesize the two photographed face images and to thereby display a new face image.

SUMMARY OF THE INVENTION

It is an object of the present invention to provide a face image synthesis apparatus which photographs a two-dimensional image including a face of a person by an image sensor, extracts a face image from the photographed two-dimensional image, animates the face image or processes the face image by exchanging a facial part or the like, and thereby automatically forms a new face image. It is another object of the present invention to provide a face image synthesis method and a computer program for executing the method according to the present invention on a computer. It is yet another object of the present invention to provide a communication terminal which comprises such a face image synthesis apparatus and a communication method by using the communication terminal.

The face image synthesis apparatus according to one aspect of the present invention comprises an image input unit which fetches an image including a face of a person, a face region acquisition unit which acquires a face region including a head of the person from the image, and a face region processing unit which processes image data corresponding to the face region to form a different face image that is different from the fetched image.

The face image synthesis method according to another aspect of the present invention comprises fetching an image including a face of a person, acquiring a face region including a head of the person from the image, and processing image data corresponding to the face region to form a different face image that is different from the fetched image.

The communication terminal according to still another aspect of the present invention comprises an image input unit which fetches an image including a face of a person, a face region acquisition unit which acquires a face region including a head of the person from the image, and a face region processing unit which processes image data corresponding to the face region to form a different face image that is different from the fetched image, a display unit which displays the different face image, and a communication unit which transmits or receives the different face image.

The communication method of a communication terminal, the including an image input unit which fetches an image including a face of a person, a face region acquisition unit which acquires a face region including a head of the person from the image, and a face region processing unit which processes image data corresponding to the face region to form a different face image that is different from the fetched image, a display unit which displays the different face image, and a communication unit which transmits or receives the different face image, according to still another aspect of the present invention comprises displaying on the display unit, when the communication terminal receives a call or a mail, the different face image to thereby inform reception of the call or the mail.

The computer program according to still another aspect of the present invention makes it possible to execute the methods according to the present invention on a computer.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 7A and FIG. 7B are views which show another example of how the face image may be vibrated, wherein FIG. 7A shows that the face image is enlarged or reduced in a radial direction, and FIG. 7B shows that the face image is rotated, FIG. 13A through FIG. 13D are views which show an example of a communication terminal in the fourth embodiment.

DETAILED DESCRIPTION

Embodiments of a face image synthesis apparatus, a face image synthesis method and a program for executing the method as well as a communication terminal which comprises the face image synthesis apparatus and a communication method by the communication terminal according to the present invention will be explained hereinafter in detail with reference to the accompanying drawings.

Figure 1:
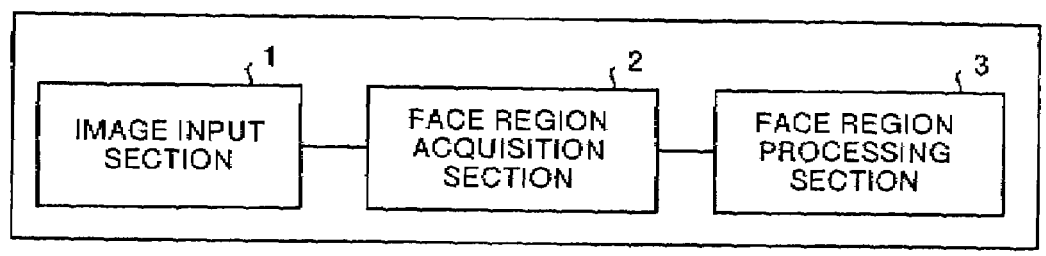
FIG. 1 is a block diagram which shows a configuration of a first embodiment of a face image synthesis apparatus.

FIG. 1 is a block diagram which shows the configuration of a face image synthesis apparatus in a first embodiment of the present invention. This face image synthesis apparatus includes an image input section 1, a face region acquisition section 2 and a face region processing section 3.

The image input section 1 includes an image sensor and functions to photograph a two-dimensional image. The image sensor is a CCD camera or the like. The face region acquisition section 2 functions to analyze the image which is photographed by the image input section 1 and to extract a region including the head of a person. In addition, the face region processing section 3 functions to form an image which appears as if the image of the extracted region vibrates, based on the output information of the face region acquisition section 2.

Figure 2:
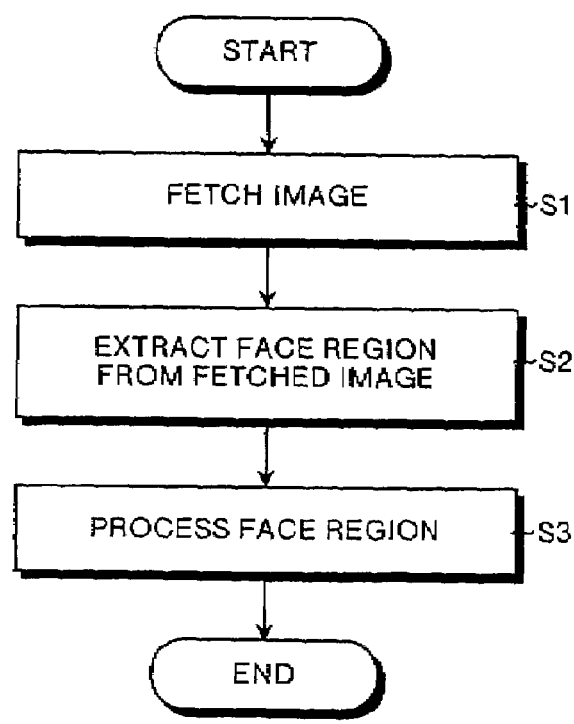
FIG. 2 is a flow chart which shows the processing of a face image synthesis method.

The operation of such a face image synthesis apparatus will be explained with reference to FIG. 1 to FIG. 7 while taking an instance of cutting down a face region based on the difference between frames using two frame images at different time as an example. FIG. 2 is a flow chart which shows processing procedures for the operation of the face image synthesis apparatus. The image input section 1 of such as a CCD camera photographs an image including the face of a person (at step S1). At this step, two frame images at different time are photographed. Normally, it is preferable to use two images at almost continuous time.

Using the two frame images which are photographed by the image input section 1 at different time, the face region acquisition section 2 performs a processing of calculating the difference between the frames and cutting down a face region (at step S2).

Figure 3:
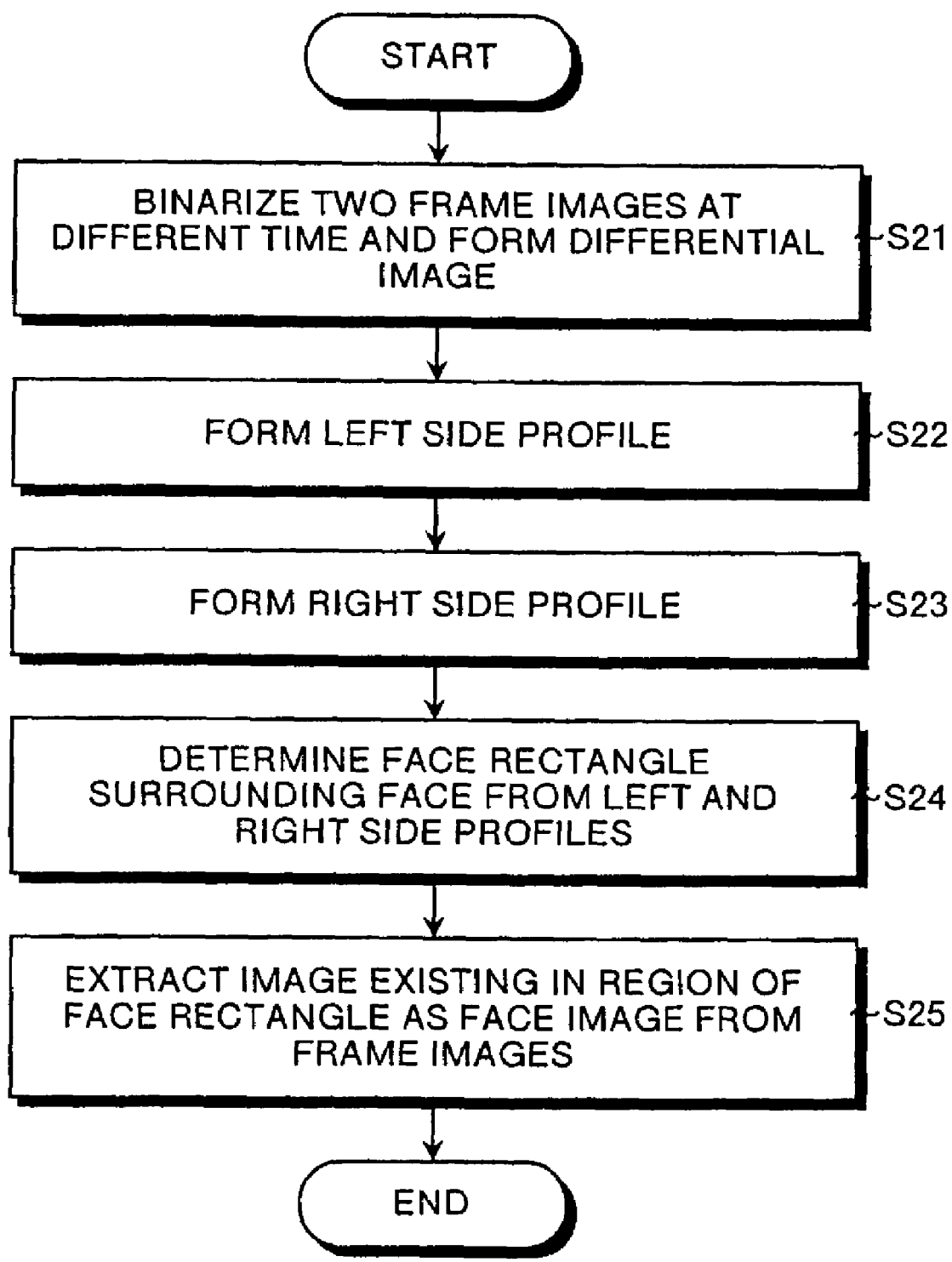
FIG. 3 is a flow chart which shows processing procedures for the operation of a face region acquisition section of the face image synthesis apparatus.
Figure 4A:
FIG. 4A through FIG. 4D are views which explain the operation of the face region acquisition section of the face image synthesis apparatus.
Figure 4B:

FIG. 3 is a flow chart which shows a face region extraction method based on an inter-frame differential method. FIG. 4A through FIG. 4D are views which explain the process of the method. FIG. 4A shows one of the frame images each of including the head of the person and which is photographed by the image input section 1. Using this image and the other image, not shown, photographed at different time from that of this image, the image shown in FIG. 4A is binarized to obtain a differential image (at step S21). The differential image means an image which consists of image data obtained by binarizing the absolute values of the differences between the corresponding pixel values of the two images. The binarized differential image is shown in FIG. 4B. In FIG. 4B, a black pixel is a pixel the value of which changes, i.e., a pixel which is considered to move, while a white pixel is a pixel the value of which has no change, i.e., a pixel which is considered not to move. Schematically, therefore, it can be considered that the black pixels correspond to a person and the white pixels correspond to a background. In the example shown in FIG. 4A through FIG. 4D, it is shown that only one person moves. However, because of noise included in the image, the background is mottled with black pixels. In addition, if a moving object exists in the background, the background section is also mottled with black pixels. If the black pixels are mixed into the background and the main section of the image is one person, then the black pixels can be processed as noise.

Figure 4C:
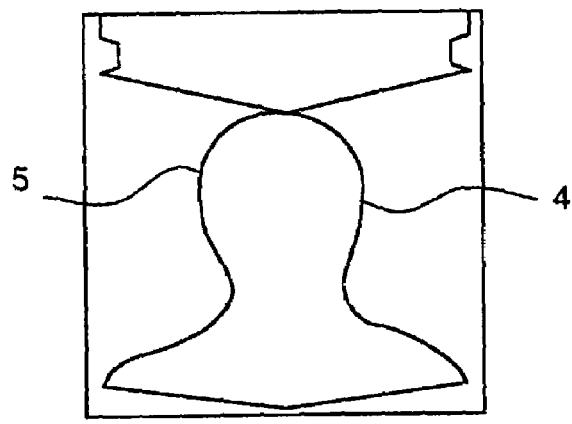

A processing of searching the black pixels horizontally from the left end position of the image to the right direction thereof, and registering a position at which a black pixel first appears, is performed in the differential image obtained as shown in FIG. 4B. This processing is executed from the uppermost end of the image to the lowermost end thereof at predetermined intervals. Further, the positions at which black pixels first appear are connected to thereby form a left side profile 5 (at step S22) Conversely, a processing of searching the black pixels horizontally from the right end position of the image to the left direction, and registering a position at which a black pixel first appears, is executed from the uppermost end of the image to the lowermost end thereof at predetermined intervals. A right side profile 4 is formed by connecting the positions (at step S23). FIG. 4C shows the right side profile 4 and the left-side profile 5 thus formed. As is obvious from FIG. 4C, these left and right side profiles 4 and 5 intersect each other at the position of the vertex of the person which exists just at the center of the image and the lower sections of the intersection form the silhouette of the person.

A rectangle which surrounds the face is determined from the silhouette which is formed by the left and right side profiles 4 and 5 shown in FIG. 4C (at step S24). First, the upper end of the rectangle is determined as a vertical coordinate (i.e., a coordinate in the vertical direction of the drawing) of the intersection between the left and right side profiles 4 and 5 and then determined by a straight line which passes this coordinate and which is drawn in parallel to the horizontal direction of the intersection (i.e., the lateral direction of the drawing).

The right end of the rectangle is determined as the horizontal coordinate of a point (denoted by "A") the distance of which from the left end of the image of the right side profile 4 becomes maximal below the intersection between the left and right side profiles 4 and 5 (i.e., a coordinate in the horizontal direction of the drawing), and determined by a straight line which passes this coordinate (point A) and which is drawn in parallel to the vertical direction (i.e., vertical direction of the drawing). Likewise, the left end of the rectangle is determined as the horizontal coordinate of a point (denoted by "B") the distance of which from the right end of the image of the left side profile 5 becomes maximal below the intersection between the left and right side profiles 4 and 5, and determined by a straight line which passes this coordinate (point B) and which is drawn in parallel to the vertical direction of the image.

The lower end of the rectangle is determined by averaging the vertical coordinate of a point at which a line drawn from the point A downward horizontally intersects first the right side profile 4 and the vertical coordinate of a point at which a line drawn from the point B downward vertically intersects first the left side profile 5, and determined by a straight line which passes the average vertical coordinate and which is drawn in parallel to the horizontal direction.

Figure 4D:
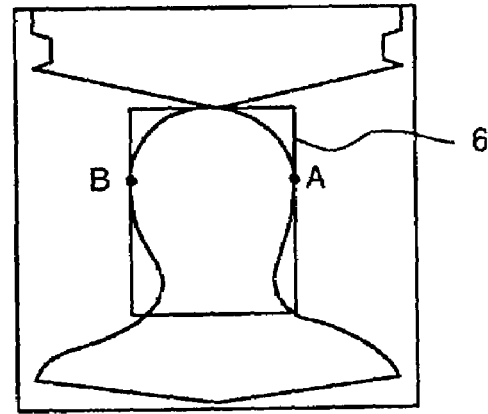

The rectangle surrounded by the four straight lines thus obtained is a face rectangle 6. FIG. 4D is a view which shows a state in which the face rectangle 6 thus obtained is drawn while being superposed on the left and right side profiles 4 and 5.

The face rectangle 6 thus obtained is determined as a face region and the image which exists inside of this face region is extracted as a face image (at step S25). Specifically, the obtained face rectangle 6 is applied to the frame image shown in FIG. 4A and the image which exists inside of this face region is extracted as a face image. The processing of the face region acquisition section 2 is thus ended.

If the face region acquisition section 2 extracts the face image from the frame image, the face region processing section 3 processes the extracted face image (at step S3). By way of example, an instance of vibrating the extracted face image in horizontal direction will be explained with reference to FIG. 5 and FIG. 6A through FIG. 6C.

Figure 5:
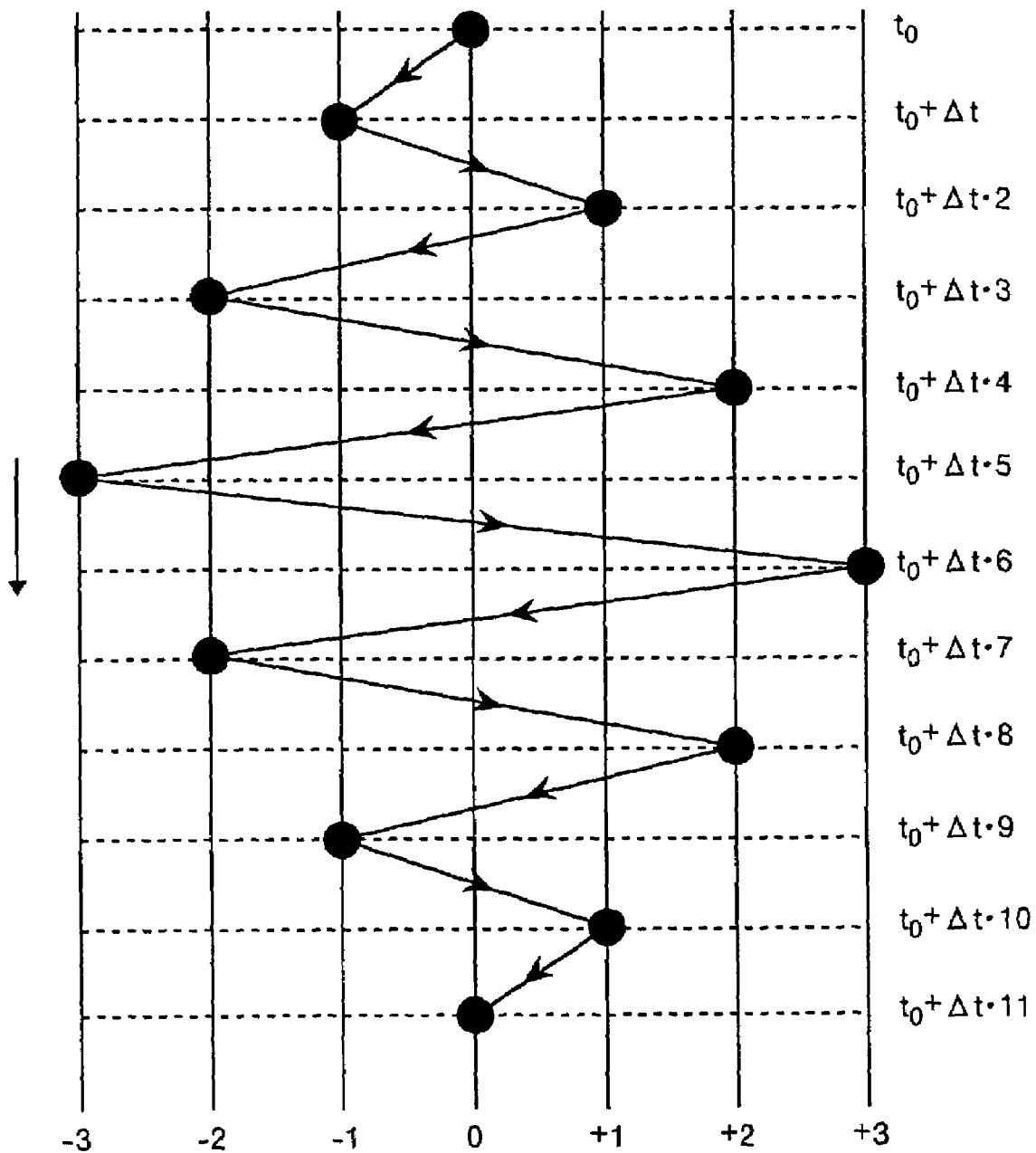
FIG. 5 is a view which explains processing procedures for the operation of the face region processing section of the face image synthesis apparatus.

FIG. 5 shows that the displacements of the respective pixels are shown in time series so as to form an image string which makes the partial image in the face region acquired by the face region acquisition section 2 appear vibrating. In FIG. 5, time flows downward and a horizontal displacement is a displacement with reference to the specific azimuth (horizontal direction here) of the partial image at each time. The unit of this horizontal displacement is assumed as an arbitrary unit for the convenience of the explanation. In FIG. 5, at time $t_0$, the partial image exists at a reference position, i.e., a position "0". If time $\Delta t$ passes from the time $t_0$, the partial image is displaced from the reference position by "1" in the left direction. In addition, if time $\Delta t \cdot 2$ passes from the time $t_0$, it is at a position displaced from the reference position by "1" in the right direction. If compared with that of the time $t_0+\Delta t$, it is displaced by +2 in the right direction. Likewise, the partial image is displaced with the passage of time. If the partial image returns to the reference position "0" at time $t_0+\Delta t \cdot 11$, the vibration is repeated again from the time $t_0$.

Figure 6A:
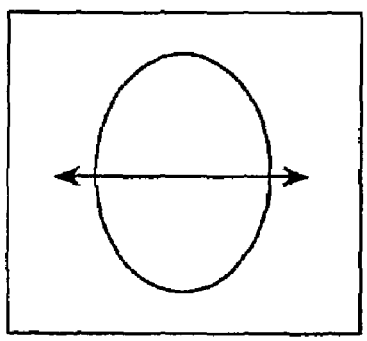
FIG. 6A through FIG. 6C are views which explain an operation for forming a face image which vibrates in a horizontal direction.
Figure 6B:
Figure 6C:

FIG. 6A through FIG. 6C are views which explain an example of vibrating the face image around the face region for the azimuth with reference to the horizontal direction of the image. FIG. 6A shows the azimuth in which the face image is vibrated. FIG. 6B shows the face image which is extracted by the face region acquisition section 2. FIG. 6C shows an image in which the vibrating face image which is formed by the face region processing section 3 is displayed as the average of the passage of time. The image shown in FIG. 6C is shown as the average of the passage of time of the image which is obtained by displacing the face image shown in FIG. 6B in the horizontal direction (shown by an arrow in FIG. 6A) with the passage of time as shown in FIG. 5. The manner of the vibration of the face image actually displayed can appear as the same as that shown in FIG. 6C to the human eyes.

Figure 7A:
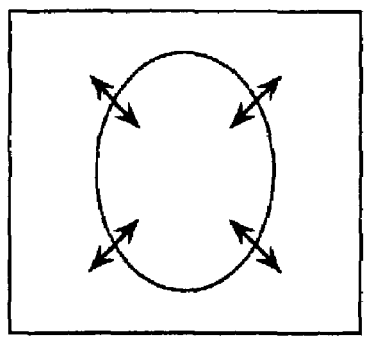
Figure 7B:
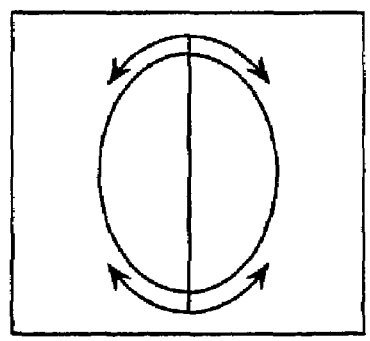

The azimuth of the image displacement for forming a vibrating face image may be a vertical direction, an enlargement and reduction direction shown in FIG. 7A or a rotation direction show in FIG. 7B besides the horizontal direction shown in FIG. 5. In any instance, it is possible to use the same method as the method of vibrating the image in the horizontal azimuth. For example, the change of the horizontal displacement of the image shown in FIG. 5 with time is changed to the change of an enlargement and reduction rate with time if the face image is enlarged or reduced as shown in FIG. 7A. In addition, it is changed to the change of a rotation rate with time if the face image is rotated as shown in FIG. 7B. Further, the displacement of the image with time shown in FIG. 5 is only one example, and it is also possible to set, for example, the amplitude of the displacement to be increased gradually with the passage of time.

As explained above, the processing of extracting the face image from the image which is photographed by the image input section 1 and which includes the head of the person, and vibrating the face image is performed.

It has been explained above by way of example that the face region acquisition section 2 calculates a differential image using two images photographed at continuous time among the input images which are photographed by the image input section 1. It is also possible to use the other method. For example, using a method of allowing the face region acquisition section 2 to extract the profile of the person by subjecting one still image to edge analysis or the like, a profile which includes the head and the shoulder as explained above may be extracted, followed by forming a vibrating face image by the same method. In this instance, it is possible to form the vibrating face image not only from the images which are fetched by the image input section 1 but also the images which are already photographed and stored.

It has been explained above by way of example that the face region acquisition section 2 calculates a differential image using two images at continuous time among the input images which are photographed by the image input section 1. Alternatively, even if the image is an image of one frame which includes only one person in the image, which has a background of a uniform color and which is photographed by the image input section 1, it is possible to obtain the same result as that of the first embodiment by shifting the image by few pixels in vertical or horizontal direction to construct a new image and applying the same processing as the differential image processing of the face region acquisition section 2 explained in the first embodiment for these two images. In this instance, therefore, it is possible to form a vibrating face image from not only the images which are fetched by the image input section 1 but also the images which are already photographed and stored.

As explained so far, according to the first embodiment, the face region acquisition section 2 acquires a face region from the image which is photographed by the image input section 1 there is formed an image which appears as if the face region vibrates. Therefore, it is possible to visually express the operation of a vibrator which is provided at a cellular phone when a call is received. It is also possible to express visually to those who dislike the vibrations of the vibrator, and moreover, express time for awaiting a person on the other end of the line since a call is received until a person is on the phone by the intensity of the amplitude of a face vibrating image.

The face image synthesis method for synthesizing a face image from the photographed image as explained above can be realized by a face image synthesis program readable by a computer or the like.

A configuration of a face image synthesis apparatus in the second embodiment is the same as that shown in FIG. 1 in the first embodiment. In the second embodiment, the apparatus is such that a face region processing section 3 functions to detect the positions of facial parts such as eyes or a mouth from a face image, to extract the inside region of the face image using the result, to exchange the inside region to one of the inside regions which are extracted from face images of two or more different persons to thereby form a new face image.

Figure 8:
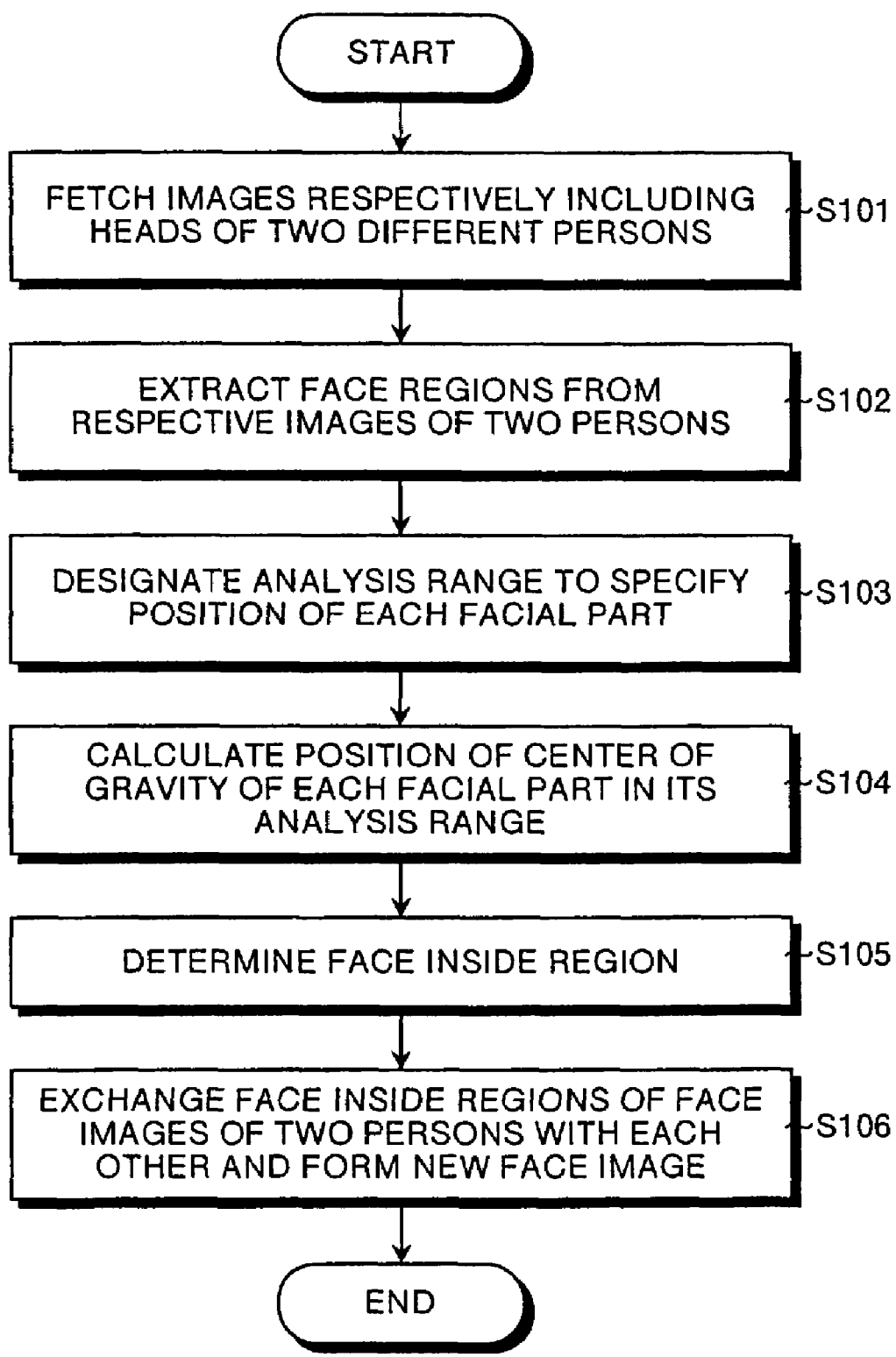
FIG. 8 is a flow chart which shows processing procedures for the operation of the second embodiment of a face image synthesis method.
Figure 9A:
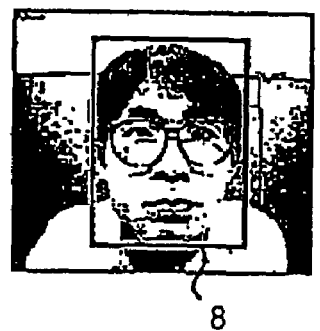
FIG. 9A through FIG. 9C are views which explain an operation for detecting a facial part by the face region processing section of the face image synthesis apparatus.
Figure 9B:
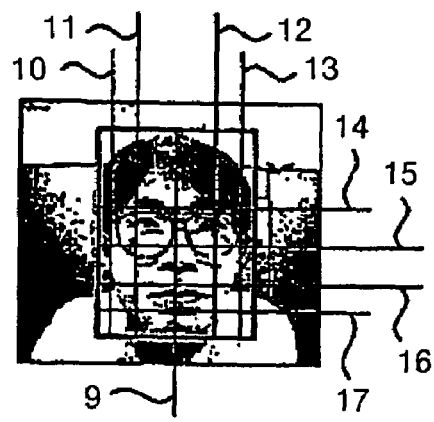
Figure 9C:
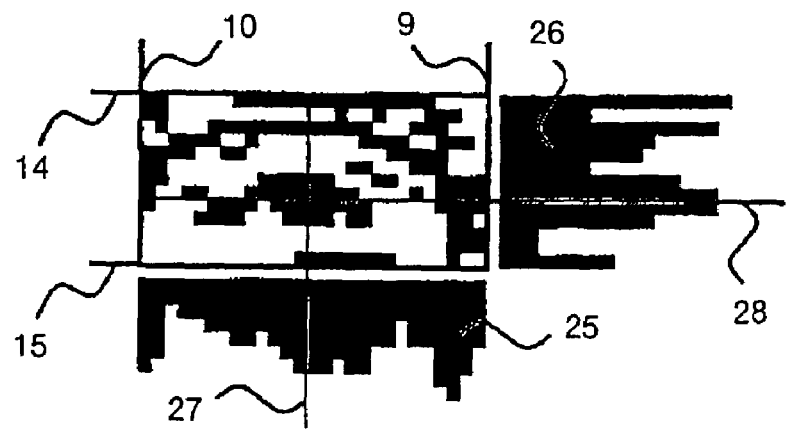

A method of exchanging inside regions which are extracted from the face images of two different persons and forming a new face image will be explained with reference to FIG. 8 through FIG. 11D. FIG. 8 is a flow chart which shows the processing of operation of the face image synthesis apparatus in this second embodiment. FIG. 9A through FIG. 9C are views which explain one example of a method of specifying characteristic points such as eyes, a nose and a mouth from a face region by the face image syntheses apparatus.

The image input section 1 first photographs images which include the heads of two different persons, respectively (at step S101). Thereafter, the face region acquisition section 2 extracts face regions from the respective images as in the instance of the first embodiment from the fetched images that include heads of the two persons (at step S102). FIG. 9A is a view which shows a state in which a head rectangle 8 which is acquired by the face region acquisition section 2 is superposed on the input frame image and displayed. It is noted that the head rectangle 8 corresponds to the face rectangle 6 in the first embodiment.

The face region processing section 3 then performs a processing for specifying the positions of characteristic points such as eyes, a nose and a mouth from the extracted face regions of each person. First, as shown in FIG. 9B, a processing for designating analysis target regions to specify the positions of the respective facial parts is performed (at step S103). Specifically, they are designated by straight lines denoted by 9 to 17 in FIG. 9B. These straight lines 9 to 17 are attained by statistically obtaining the relative positions of the respective facial parts such as the eyes, the nose and the mouth, to the head shape of an ordinary person. The rectangular region formed by a combination of these straight lines 9 to 17 is obtained as analysis ranges for the respective facial parts. That is, the upper, lower, left and right edges of the respective facial parts and the rectangular regions corresponding to the facial parts are designated by lines 14, 15, 10 and 9 for the right eye, 14, 15, 9 and 13 for the left eye, 15, 16, 11 and 12 for the nose and 16, 17, 11 and 12 for the mouth.

The position of the center of gravity of each facial part in the analysis range thereof is next calculated (at step S104). By way of example, a method of detecting the position of the right eye section among those of detecting the respective facial parts will be explained with reference to FIG. 9C. As shown in FIG. 9C, the pixel values of the input image in the detection region surrounded by the straight lines 14, 15, 10 and 9 are binarized. The binarization is carried out as follows. If a pixel value is greater than a certain threshold, it is expressed by 0 (white pixel). If a pixel value is smaller than the certain threshold, it is expressed by 1 (black pixel). Thereafter, to calculate the detection position of the right eye (the center of the apple of the right eye) based on the position of the center of gravity, the respective pixel values of the binary image in the detection region are added together according to columns and rows to thereby calculate projection data. A histogram denoted by reference symbol 25 in FIG. 9C represents the projection data calculated in vertical direction (for each column) and a histogram denoted by reference symbol 26 represents the projection data calculated in horizontal direction (for each row). Using these pieces of projection data, the centers of gravity are calculated and the horizontal and vertical positions of the right eye detection position are obtained. In FIG. 9(*c*), for example, the position of the center of gravity calculated from the projection data 25 in the vertical direction is 27 and that calculated from the projection data 26 in the horizontal direction is 28. Therefore, the horizontal and vertical components of a coordinate are obtained as the position of the right eye.

Similarly to the method of obtaining the position of the right eye explained above, the position coordinates of the left eye, the nose and the mouth can be obtained by each calculating the positions of the centers of gravity from the binary images in each rectangular regions.

The horizontal and vertical positions of each facial part may be calculated from a position at which the projection data becomes a maximum instead of the centers of gravity calculated from the projection data. In addition, while the projection data is calculated by binarizing the pixel values in the above example, it can be calculated not by binarizing the image but by adding actual pixel values together to thereby calculate the horizontal and vertical positions.

The characteristic points of the facial parts have been explained while taking the eyes, the nose and the mouth as an example. It is also possible to set the other facial part elements, e.g., eyebrows, the shape of a forelock, cheeks and/or ears, as detection targets. In this instance, it is necessary to statistically obtain straight lines to attain the analysis range of each facial part element as a rectangular region and to further set the straight lines in the head rectangle 8.

Using the positions of the both eyes and the mouth obtained in the face region as explained above, the face inside region is determined (at step S105). This face inside region is extracted and exchanged to the face inside region of a face image similarly obtained from the other person, thereby forming a new face image (at step S106).

Figure 10A:
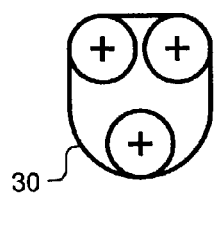
FIG. 10A to FIG. 10G are views which show an example of cutting down a face inside, region by the face region processing section of the face image synthesis apparatus and exchanging the face inside regions of the face images of two different persons to each other to create a new face image.

FIG. 10A through FIG. G are views which explain the exchange of the face inside regions between the face images of different persons. FIG. 10A shows a region cut-down template 30 which includes three circle regions with reference to the positions of the both eyes and the mouth, respectively. This region cut-down template 30 is constituted out of a curve closed to surround and include three circles which are arranged at positions corresponding to the both eyes and the mouth, respectively. Crisscrosses existing at the centers of the three circles in the region cut-down template 30 are superposed on the positions of the centers of gravity of the both eyes and the mouth calculated at the step S104, respectively, whereby the face inside region is determined.

Figure 10B:
Figure 10C:
Figure 10F:
Figure 10D:
Figure 10E:
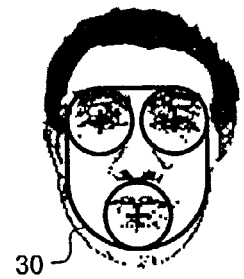

FIG. 10B shows the face image of a certain person. FIG. 10C shows a face image obtained by superposing the region cut-down template 30 on the positions of the centers of gravity of the both eyes and the mouth detected on the face image shown in FIG. 10B by the above-explained procedures. FIG. 10D shows the face image of a person different from the person shown in FIG. 10B. FIG. 10E shows a face image obtained by superposing the region cut-down template 30 on the positions of the center of gravity of the both eyes and the mouth detected on the face image shown in FIG. 10D by the above-explained procedures. A region which is inside of this region cut-down template 30 and which is to be cut down will be referred to as a face inside region, and a face region other than this will be referred to as a face outside region, hereinafter.

Figure 10G:

The partial regions of the face images of the two different persons cut down by the region cut-down template 30 are exchanged to each other, whereby a new face image can be formed. FIG. 10F shows the new face image which is formed by inserting the face inside region shown in FIG. 10C into the face outside region shown in FIG. 10E. FIG. 10G shows a face image formed by inserting the face inside region shown in FIG. 10E into the face outside region shown in FIG. 10C.

In this way, a new image can be formed from the face images of two different persons.

Figure 11A:
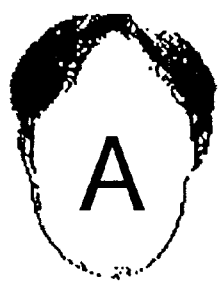
FIG. 11A through FIG. 11D are views which show an example of cutting down different face regions from the face images of four persons by the face region processing section of the face image synthesis apparatus and forming a new face image.
Figure 11B:
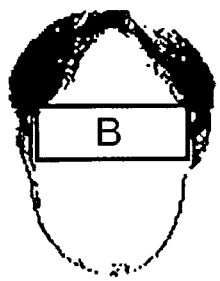
Figure 11C:
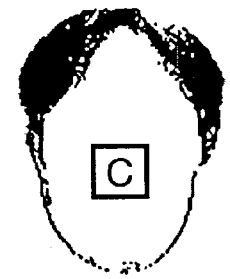
Figure 11D:
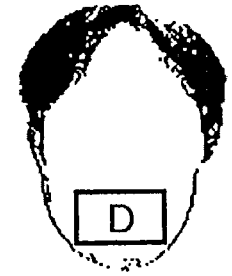

It has been explained by way of example in the second embodiment that the face region processing section 3 forms a new face image from the face images of two different persons. Alternatively, a new face image may be formed by cutting down the partial regions of the face inside regions from the face images of, for example, three or more different persons and combining facial parts such as a hairstyle, both eyes and a mouth from the cut-down partial regions. FIG. 11A through FIG. 11D are views which show an example of face inside partial regions which are cut down from individual face images if a new face image is formed from the face images of four persons. FIG. 11A shows the face outside region A explained above. FIG. 11B shows an eye region B. FIG. 11C shows a nose region C. FIG. 11D shows a mouth region D which is a part of the face inside region. By inserting the eye region B, nose region C and mouth region D which are extracted as parts of the face inside region from the respectively different persons into the face outside region A of a certain person, a new face image can be formed. In this way, by partitioning the face inside region into smaller regions, it is possible to form a new face image from the face images of three or more persons.

It is possible to form a new face image not only by the images which are fetched by the image input section 1 but also by the images which are already photographed and stored.

The face image synthesis method of synthesizing face images from the photographed images as explained above can be realized as a face image synthesis program readable by a computer or the like, and the program can be executed by allowing a computer or the like to read the program.

As a third embodiment, an example of applying the face image synthesis apparatus or the face image synthesis method explained in the first embodiment, to a communication terminal will be explained.

Figure 12A:
FIG. 12A through FIG. 12C are views which show an example of a communication terminal in the third embodiment.
Figure 12B:
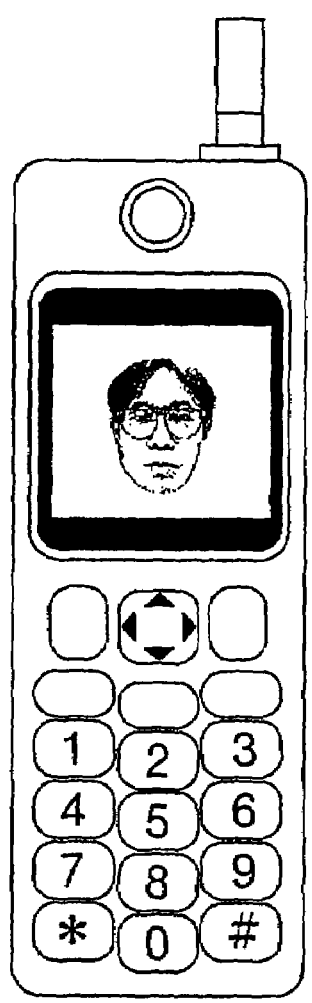
Figure 12C:
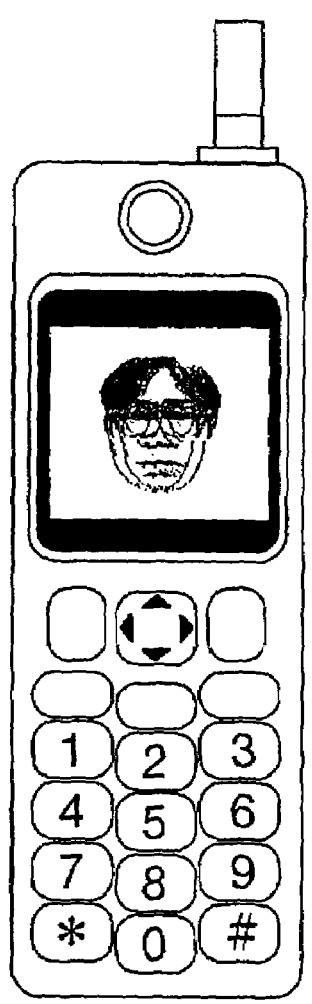

FIG. 12A through FIG. 12C are views which show the communication terminal which includes the face image synthesis apparatus according to the present invention in the third embodiment. An example of applying the face image synthesis apparatus to a cellular phone as the communication terminal is shown in these figures. In FIG. 12A, reference symbol 31 denotes a cellular phone, 32 denotes a small-sized camera and 33 denotes a display section such as a liquid crystal display. This display section 33 displays an image which is photographed by the small camera 32 and which includes the face of a photographing target person.

FIG. 12B is a view which shows a state in which a face region which is extracted by the face region acquisition section 2 of the face image synthesis apparatus provided in the cellular phone 31 is displayed on the display section 33. FIG. 12C is a view which shows a state in which a face which is formed by the face region processing section 3 of the face image synthesis apparatus, i.e., an image which appears as if the image is vibrating as explained in the first embodiment (which image will be referred to as "vibrating face image" hereinafter) is displayed on the display section 33 when the cellular phone 31 receives a call. By displaying the vibrating face image, for example, in response to the operation of a vibrator provided at the cellular phone 31, it is possible to visually express the operation of the vibrator. Needless to say, it is also possible to transmit and receive the vibrating face image as time-series image data.

An image can be photographed using the small camera 32 as usual. It is certainly possible to form vibrating face images using images which are already stored in the cellular phone or images which are received by the other cellular phone.

If these vibrating face images are set so that the face image of each of mail senders is vibrated on the waiting screen of the cellular phone when the phone waits to receive a mail, they are more effective in communication such as mail. Specifically, vibrating face images are set so that vibrating face images are stored while associating the images with individual information registered in the address book of the cellular phone and that the vibrating face image associated with each sender address is extracted and displayed. By so setting, it is possible to instantly determine from whom or from what type of a person the cellular phone receives a mail by checking the vibrating face image displayed on the display section 33.

The vibrating face images formed in the present invention can be employed as various indicators for a portable communication equipment or the like. If the battery of the portable communication equipment is about to be dead, for example, the face image of the owner of the equipment which vibrates while being enlarged and reduced is set to be displayed, whereby the owner can be easily informed of a battery exchange or charge moment. In addition, if there are many received mails unopened, the face image of the owner which vibrates while rotating is set to be displayed according to the state of the accumulation, whereby the owner can be easily informed of the state of the accumulation of mails.

The communication terminal has been explained above while taking a cellular phone as an example. The communication terminal is not intended to be limited to the cellular phone but may be an arbitrary portable information terminal which can display, transmit and receive vibrating face images. For example, it can be applied to a PDA, a notebook personal computer, a videophone or the like.

In a fourth embodiment, an example of applying the face image synthesis apparatus or the face image synthesis method explained in the second embodiment, to a communication terminal will be explained.

FIG. 13A through FIG. 13D are views which show a fourth embodiment of a communication terminal to which the face image synthesis apparatus according to the present invention is applied. One example of employing a cellular phone as the communication terminal is shown in these figures. FIG. 13A is a view which shows a state in which the face image of a certain person is displayed on a display section 33 of a cellular phone 31. FIG. 13B is a view which shows a state in which the face image of a person different from the person shown in FIG. 13A is displayed on the display section 33.

FIG. 13C is a view which shows a state in which the face inside region of the face image which is displayed as shown in FIG. 13B is inserted into the face outside region of the face image displayed as shown in FIG. 13A and a new face image is thereby displayed on the display section 33. FIG. 13D is a view which shows a state in which the face inside region as shown in FIG. 13A is inserted into the face outside region of the face image which is displayed as shown in FIG. 13B and a new face image is thereby displayed on the display section 33, wherein the insertion is carried oppositely from that shown in FIG. 13C. The newly formed face images (to be referred to as "mated face images" hereinafter) shown in FIGS. 13C and 13D can be transmitted as image data by a mail transmission and receiving function provided at the cellular phone 31. Mated face images newly formed by a transmitter can be received. As already explained in the second embodiment, the mated face images can be formed not only from the face images of two persons but also from those of three or more persons.

According to the cellular phone which has such a face image synthesis function, it is possible for a couple without a child to enjoy synthesizing a mated face image of a possible child of the couple and also transmitting the mated face image thus synthesized to a relative, an acquaintance or the like using the cellular phone mailing function. In addition, since the face image synthesis apparatus is capable of synthesizing the face images of two or more persons, it is possible to prepare materials such as the hairstyle of a husband, the eyes of a wife, the nose of a grandfather, the mouth of a grandmother or the like and to enjoy forming a more complicated mated face image.

The communication terminal has been explained above while taking a cellular phone as an example. The communication terminal is not intended to be limited to the cellular phone but may be an arbitrary portable information terminal which can display mated face images and transmit and receive them. For example, it can be applied to a PDA, a notebook personal computer, a videophone or the like.

As explained so far, according to the present invention, an image input unit which fetches an image which includes a face of a person, a face region acquisition unit which acquires a face region which includes a head of the person, from the fetched image, and a face region processing unit which processes image data on the acquired face region and which forms a new face image, are provided. It is, therefore, possible to animate the acquired face image and to exchange facial parts between the face images of two or more persons to synthesize a new face image.

According to the next invention, the face region processing unit is constituted to displace, enlarge or reduce and/or rotate the image data on the face region with passage of time. Therefore, it is possible to form a new vibrating face image from the acquired face image.

According to the next invention, the face region processing unit is constituted to acquire face inside regions each of which includes facial parts such as both eyes, a nose and a mouth, from image data on face regions of a plurality of persons which are acquired by the face region acquisition unit and face outside regions other than the face inside regions, and to exchange the face inside region of one person to the face inside region of the other person. It is, therefore, possible to form a new face image which does not actually exist from the face images of two or more persons.

According to the next invention, each of the face inside regions is constituted to be further divided into a plurality of regions so that each includes at least one facial part. It is, therefore, possible to try to form a finer face image from the facial parts which constitute the face images of three or more persons.

According to the next invention, an image input step of fetching an image which includes a face of a person, a face region acquisition step of acquiring a face region which includes the head of a person from the fetched image, and a face region processing step of processing image data on the acquired face region, and forming a new face image, are included. It is, therefore, possible to provide a face image synthesis method of animating the acquired face image and exchanging facial parts between the face images of two or more persons to synthesize a new face image.

According to the next invention, at the face region processing step, the acquired image data on the face region is displaced, enlarged or reduced and/or rotated with passage of time, thereby forming a vibrating face image. It is, therefore, possible to provide a method of forming a new vibrating face image.

According to the next invention, at the face region processing step, face inside regions each of which includes facial parts, such as both eyes, a nose and a mouth, and face outside regions other than the face inside regions are acquired from face regions of a plurality of persons which are acquired at the face region acquisition step, and the face inside region of one person is exchanged to the face inside region of the other person, thereby forming a new face image. It is, therefore, possible to provide a method of forming a face image which does not actually exist from the face images-of two or more persons.

According to the next invention, each of the face inside regions is further divided into a plurality of regions so that each includes at least one facial part. It is, therefore, possible to provide a method of forming a finer face image from the facial parts which constitute the face images of three or more persons.

According to the next invention, a communication terminal comprises, the face image synthesis apparatus, a display unit which displays the face image formed by the face region processing unit of the face image synthesis apparatus, and a communication unit which transmits and receives the face image. It is, therefore, possible to visually express the function of a vibrator which operates when a cellular phone receives a call on the display unit and to visually entertain the owner of the cellular phone. In addition, it is possible to synthesize a face image by forecasting a possible child of a couple from the face images of the couple, to display the synthesized face image on the display unit and to entertain the owner of the cellular phone.

According to the next invention, if the communication terminal receives a call or a mail from the other communication terminal, the face image is displayed on the display unit, thereby informing reception of the call or the mail from the other communication terminal. Therefore, it is possible to visually express the function of a vibrator which operates when a cellular phone receives a call on the display unit and to visually entertain the owner of the cellular phone. In addition, it is possible to synthesize a face image by forecasting a possible child of a couple from the face images of the couple, to display the synthesized face image on the display unit and to entertain the owner of the cellular phone. Further, by utilizing these images on the waiting screen of the display unit, it is possible to realize a usage of the face image which is not feasible if only the stored face images are used. Besides, by using the new face images in cooperation with the communication unit or the like of the communication terminal, it is possible to hold comfortable communication while the owner enjoys communication.

According to the next invention, a program for executing the face image synthesis method according to any one of the above inventions is obtained.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A face image synthesis apparatus comprising:
   an image input unit which fetches an image including a face of a person;
   a face region acquisition unit which acquires a face region including a head of the person from the image; and
   a face region processing unit which processes image data corresponding to the face region to form a face image that is vibrating in one of position, size, and rotation about an axis perpendicular to the face image.

2. The face image synthesis apparatus according to claim 1, wherein the image input unit is a digital camera.

3. The image synthesis apparatus according to claim 1, wherein
   the image input unit fetches first and second different images of the face of the person, and
   the face region acquisition unit acquires the face region including the head of the person from a differential image obtained from differences between the first and second images.

4. The face image synthesis apparatus according to claim 3, wherein the face region acquisition unit defines the face region from the differential image by constructing vertical lines tangent to left and right profiles of the differential image, a first horizontal line passing through a vertical average of intersections of the first and second vertical lines with the differential image, and a second horizontal line tangent to an intersection of the left and right profiles.

5. The face image synthesis apparatus according to claim 1, wherein
   the image input unit fetches a single, first image including the face of the person, and
   the face region acquisition unit generates a second image by shifting position of the first image and acquires the face region including the head of the person from a differential image produced from differences between the first and second images.

6. The face image synthesis apparatus according to claim 5, wherein
   the face region acquisition unit defines the face region from the differential image by constructing vertical lines tangent to left and right profiles of the differential image, a first horizontal line passing through a vertical average of intersections of the first and second vertical lines with the differential image, and a second horizontal line tangent to an intersection of the left and right profiles.

7. A face image synthesis method comprising:
   fetching an image including a face of a person;
   acquiring a face region including a head of the person from the image; and
   processing image data corresponding to the face region and forming a face image that is vibrating in one of position, size, and rotation about an axis perpendicular to the face image.

8. The face image synthesis method according to claim 7, wherein
   fetching an image includes fetching first and second different images of the face of the person, and
   acquiring a face region includes forming a differential image from the differences between the first and second images.

9. The face image synthesis method according to claim 8, including defining a face region from the differential image by constructing vertical lines tangent to left and right profiles of the differential image, a first horizontal line passing through a vertical average of intersections of the first and second vertical lines with the differential image, and a second horizontal line tangent to an intersection of the left and right profiles.

10. The face image synthesis method according to claim 7, wherein
    fetching an image includes fetching a single, first image of the face of the person, and
    acquiring a face region includes generating a second image by shifting position of the first image and acquiring the face region including the head of the person from a differential image produced from differences between the first and second images.

11. The face image synthesis method according to claim 10, including defining a face region from the differential image by constructing vertical lines tangent to left and right profiles of the differential image, a first horizontal line passing through a vertical average of intersections of the first and second vertical lines with the differential image, and a second horizontal line tangent to an intersection of the left and right profiles.

* * * * *